(12) United States Patent
Lee

(10) Patent No.: US 12,175,559 B2
(45) Date of Patent: Dec. 24, 2024

(54) DATA PROCESSING METHOD AND DATA PROCESSING SYSTEM

(71) Applicant: eYs3D Microelectronics, Co., Taipei (TW)

(72) Inventor: Chi-Feng Lee, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 103 days.

(21) Appl. No.: 17/965,817

(22) Filed: Oct. 14, 2022

(65) Prior Publication Data

US 2023/0377091 A1 Nov. 23, 2023

Related U.S. Application Data

(60) Provisional application No. 63/343,547, filed on May 19, 2022.

(51) Int. Cl.
*G06T 1/60* (2006.01)
*G06T 7/80* (2017.01)

(52) U.S. Cl.
CPC ............... *G06T 1/60* (2013.01); *G06T 7/80* (2017.01)

(58) Field of Classification Search
None
See application file for complete search history.

(56) References Cited

U.S. PATENT DOCUMENTS

| | | | | |
|---|---|---|---|---|
| 6,208,772 | B1* | 3/2001 | Wilt | G06T 3/4007 382/303 |
| 2015/0213889 | A1* | 7/2015 | Miura | G11C 13/0004 365/163 |
| 2015/0229815 | A1* | 8/2015 | Nonaka | H04N 23/45 348/218.1 |
| 2017/0062025 | A1* | 3/2017 | Kim | G06F 13/1684 |
| 2017/0242785 | A1* | 8/2017 | O'Krafka | G06F 3/065 |
| 2018/0247948 | A1* | 8/2018 | Kanno | G06F 12/0246 |

FOREIGN PATENT DOCUMENTS

| | | |
|---|---|---|
| TW | 201031197 A | 8/2010 |
| TW | 201739252 A | 11/2017 |

OTHER PUBLICATIONS

Taiwan Office Action corresponding to Application No. 111139055 and issued on Jan. 31, 2023, 5 pages.

* cited by examiner

*Primary Examiner* — Sultana M Zalalee
(74) *Attorney, Agent, or Firm* — Innovation Counsel LLP

(57) ABSTRACT

A data processing method includes the following steps. An input image is received, the input image has a plurality of pixels, and each of the pixels has a pixel position. An valid region is defined in the input image, a plurality of valid pixels among the pixels are located in the valid region, and each valid pixel has a valid data. The valid data is written to the target address of the memory correspondingly according to a starting write address of the memory and a valid width of the input image, or according to the starting write address, the starting offset of the input image and the accumulation address of the memory.

18 Claims, 7 Drawing Sheets

FIG. 1

DATA PROCESSING METHOD AND DATA PROCESSING SYSTEM

This application claims the benefit of U.S. provisional application Ser. No. 63/343,547, filed May 19, 2022, the subject matter of which is incorporated herein by reference.

TECHNICAL FIELD

The present disclosure relates to a data processing method and a data processing system, and more particularly, relates to a processing method and a processing system for accessing data of an input image in a memory.

BACKGROUND

In the application of multimedia or artificial intelligence, a camera may cooperate with the memory, and, after the camera generates an input image, the data of the input image may be temporarily stored in the memory to facilitate the operation of the overall system.

However, when the amount of data of pixels of the input image is large, the data of pixels may occupy most of the memory usage. In addition, when the data of pixels of the input image are accessed in the memory at high frequency, the data accessing of the input image may occupy a large amount of bandwidth, resulting in a decrease in operation efficiency of the overall system.

Therefore, those skilled in the art are devoted to improving the data processing method between the input image and the memory, so as to reduce the accessing bandwidth of data of the input image and usage of to the memory.

SUMMARY

According to an aspect of the present disclosure, a data processing method is provided. The data processing method includes the following steps. Receiving an input image, the input image has a plurality of pixels, each of the pixels has a pixel position. Defining a valid region in the input image, a plurality of valid pixels among the pixels are located in the valid region, and each of the valid pixels has a valid data. And, writing the valid data to a plurality of target addresses of the memory correspondingly according to a starting write address of a memory and a valid width of the input image, or according to the starting write address, a starting offset of the input image and an accumulation address of the memory.

In one example of the present disclosure, the input image is generated by a camera, and a shape and an area of the valid region are related to an optical characteristic of the camera.

In one example of the present disclosure, data processing method includes allocating the target addresses according to a first address allocation relation or a second address allocation relation, wherein, the first address allocation relation is related to the starting write address and the valid width, and the second address allocation relation is related to the starting write address, the starting offset and the accumulation address.

In one example of the present disclosure, the step of writing the valid data to the target addresses of the memory correspondingly comprises determining whether a current pixel among the pixels has the valid data, and when the current pixel has the valid data, writing the valid data of the current pixel to the corresponding target address according to the first address allocation relation.

In one example of the present disclosure, data processing method includes reading the valid data stored in the target addresses of the memory according to the first address allocation relation.

In one example of the present disclosure, the step of writing the valid data to the target addresses of the memory correspondingly comprises determining whether a current pixel among the pixels has the valid data, when the current pixel has the valid data, writing the valid data of the current pixel to the corresponding target address according to the second address allocation relation, and accumulating an address of the memory corresponding to the current pixel from the starting write address of the memory, and writing the valid data of the current pixel to the address which is currently accumulated so as to allocate the target addresses as consecutive addresses.

In one example of the present disclosure, data processing method includes reading the valid data stored in the target addresses of the memory according to the second address allocation relation.

In one example of the present disclosure, a boundary of the valid region is related to a predetermined statement, when the pixel position of a current pixel among the pixels conforms to the predetermined statement, the current pixel has the valid data.

In one example of the present disclosure, the pixels are arranged in a plurality of rows in the input image, and a valid width of each of the rows or an accumulation address corresponding to each of the rows is recorded in a look-up table, it is determined whether a current pixel among the pixels has the valid data, and the valid data is written to the corresponding target address.

In one example of the present disclosure, the memory is a dynamic random access memory (DRAM), and the look-up table is established in an external static random access memory (SRAM).

According to another aspect of the present disclosure, a data processing system is provided. The data processing system includes a camera, a memory and a processor. The camera receives an input image, the input image has a plurality of pixels, each of the pixels has a pixel position. The memory has a plurality of target addresses. The processor is configured to define a valid region in the input image, a plurality of valid pixels among the pixels are located in the valid region, and each of the valid pixels has a valid data, and write the valid data to a plurality of target addresses of the memory correspondingly according to a starting write address of a memory and a valid width of the input image, or according to the starting write address, a starting offset of the input image and an accumulation address of the memory.

In one example of the present disclosure, a shape and an area of the valid region are related to an optical characteristic of the camera.

In one example of the present disclosure, the processor is configured to allocate the target addresses according to a first address allocation relation or a second address allocation relation, wherein, the first address allocation relation is related to the starting write address and the valid width, and the second address allocation relation is related to the starting write address, the starting offset and the accumulation address.

In one example of the present disclosure, the processor is configured to determine whether a current pixel among the pixels has the valid data, when the current pixel has the valid data, writing the valid data of the current pixel to the corresponding target address according to the first address allocation relation.

In one example of the present disclosure, the processor is configured to read the valid data stored in the target addresses of the memory according to the first address allocation relation.

In one example of the present disclosure, the processor is configured to determine whether a current pixel among the pixels has the valid data, when the current pixel has the valid data, write the valid data of the current pixel to the corresponding target address according to the second address allocation relation, and configured to accumulate an address of the memory corresponding to the current pixel from the starting write address of the memory, and write the valid data of the current pixel to the address which is currently accumulated so as to allocate the target addresses as consecutive addresses.

In one example of the present disclosure, the processor is configured to read the valid data stored in the target addresses of the memory according to the second address allocation relation.

In one example of the present disclosure, the pixels are arranged in a plurality of rows in the input image, and a valid width of each of the rows or an accumulation address corresponding to each of the rows is recorded in a look-up table, the processor is configured to read the valid data stored in the target addresses according to the look-up table.

In one example of the present disclosure, a boundary of the valid region is related to a predetermined statement, and the look-up table is established according to the predetermined statement.

In one example of the present disclosure, the memory is a dynamic random access memory (DRAM), and the look-up table is established in an external static random access memory (SRAM).

BRIEF DESCRIPTION OF THE DRAWINGS

FIG. 1 is a schematic diagram of an input image of the present disclosure.

Figure 2:
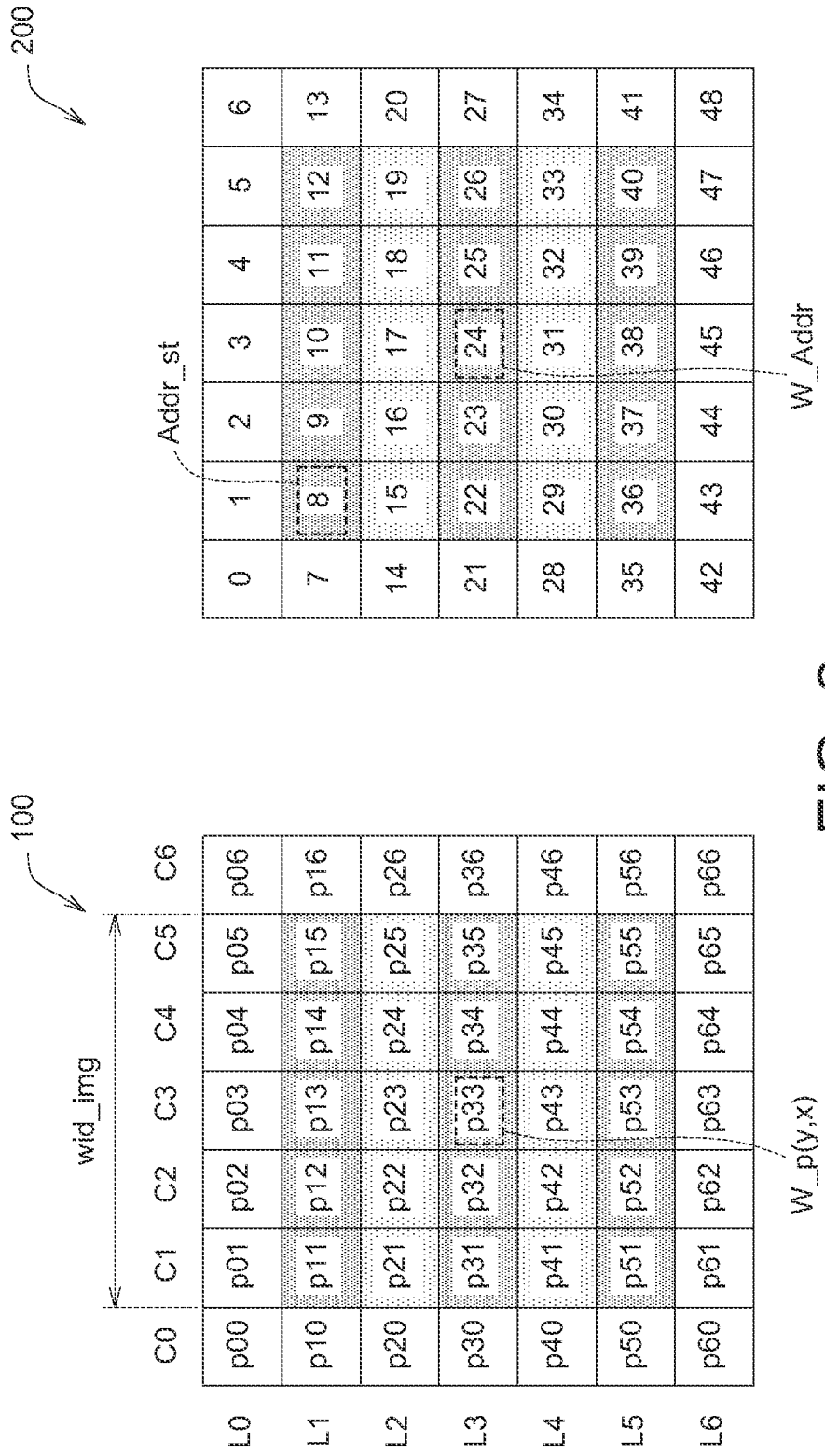
FIG. 2 is a schematic diagram of the data processing method of the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 1:
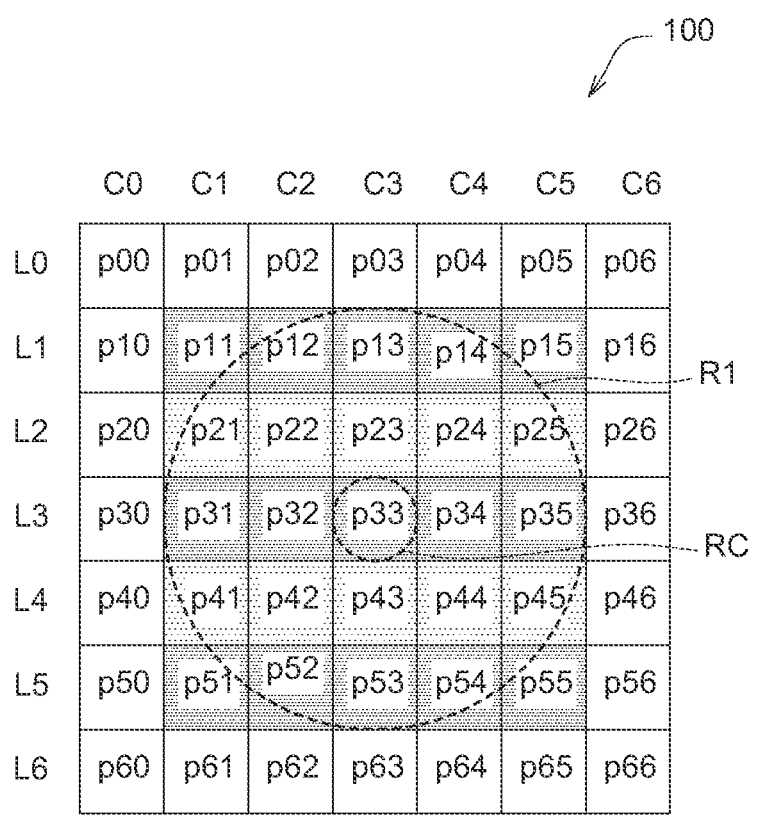

FIG. 1 is a schematic diagram of an input image 100 of the present disclosure. As shown in FIG. 1, the input image 100 includes a plurality of pixels p00-p66, and the pixels are arranged in a plurality of rows (or referred to as "lines") L0-L6 and a plurality of columns C0-C6. The pixel position (y,x) of each of the pixels p00-p66 corresponds to row Ly and column Cx. For example, the pixel position (0,0) of pixel p00 corresponds to row L0 and column C0, the pixel position (0,1) of pixel p01 corresponds to row L0 and column C1, and so on.

The input image 100 is generated by a camera (not shown in the figure). Each of the pixels p00-p66 of the input image 100 has a data (i.e., image data of the input image 100), and the data amount of the data of each pixel is, for example, one byte (i.e., 8 bits)). Based on the characteristics of the camera, among the pixels p00-p66, only some of the pixels have valid data, and the pixels with valid data are referred to as "valid pixels". These valid pixels form a valid region R1 of the input image 100. When the valid region is a region that can actually receive the light source validly, the shape and area size of the valid region R1 are related to the optical characteristics of the camera. For example, when the lens of the camera is a fisheye lens, the valid region R1 is substantially circular. In addition, the valid region may be a user-defined region.

In the embodiment of FIG. 1, the pixels included in the valid region R1 (i.e., the pixels located in the valid region R1) are: the pixels p11-p15 in the row L1, the pixels p21-p25 in the row L2, and the pixels p31-p35 in the row L3, pixel p41-p45 of row L4, and pixel p51-p55 of row L5. That is, the above-mentioned pixels p11-p15, p21-p25, p31-p35, p41-p45 and p51-p55 are valid pixels, and these valid pixels have valid data.

In contrast, the pixels located outside the valid region R1 are: pixels p00-p06 in row L0, pixels p60-p66 in row L6, pixels p10-p50 in row C0, and pixels p16-p56 in row C6. The above-mentioned pixels p00-p06, p60-p66, p10-p50 and p16-p56 are "invalid pixels", and these invalid pixels have invalid data.

Predetermined statement of pixel position (y,x) is obtained by real-time or on-line computation performed by the processor of the camera, or by off-line computation of the processor outside the camera, and then defining the boundary of the valid region R1. In this embodiment, the valid region R1 is circular, the center RC of the valid region R1 corresponds to the pixel p33 at the pixel position (3,3), and the radius of the valid region R1 is 2. The circumference of the valid region R1 is the boundary, and the distance between the pixel position (y,x) on the boundary and the center RC is equal to 2. Equation (1) is the first predetermined statement of the pixel position (y,x), which is used to define the boundary of the valid region R1:

$$\sqrt{(x-3)^2+(y-3)^2}=2 \qquad (1)$$

Similarly, equation (2) is the second predetermined statement of pixel position (y,x), which is used to define the valid pixels in the valid region R1:

$$\sqrt{(x-3)^2+(y-3)^2}<2 \qquad (1)$$

When the pixel position (y,x) of the pixel conforms to the second predetermined statement, it is determined that the pixel is located in the valid region R1, the pixel is an valid pixel, and the pixel has valid data. The first predetermined statement of equation (1) and the second predetermined statement of equation (2) are applicable when the valid region R1 is circular. In other examples, the valid region R1 can be other shapes (e.g., rectangle, square, triangle, hexagon or other polygons, etc.), the boundary of the valid region R1 of different shapes are defined according to different predetermined statements.

FIG. 2 is a schematic diagram of the data processing method of the first embodiment of the present disclosure. The data processing method includes a write operation and a read operation, and may be applied to the input image 100 of FIG. 1. The write operation is to write the data of the pixels of the input image 100 to the memory 200, and the read operation is to read out the data which has been written in the memory 200. The memory 200 is, for example, a dynamic random access memory (DRAM). In this embodiment, the address of the memory 200 is represented by consecutive decimal values. The starting address of the memory 200 is address 0, the next address of the starting address is address 1, and so on. The final address of the memory 200 is, for example, address 48.

In the embodiment shown in FIG. 2, in order to save the bandwidth of the write operation of the input image 100 (i.e., to reduce the number of writing times and the amount of written data from the input image 100 to the memory 200), only data of the valid pixels of the input image 100 (i.e., pixels in the valid region R1) are written to the memory 200, and the invalid pixels (i.e., pixels outside the valid region R1) do not need to be written to the memory 200. In one example, it is determined whether the current pixel is a valid pixel according to whether the pixel position (y,x) of the current pixel conforms to the second predetermined statement of equation (2). For example, if the current pixel p00 does not conform to the second predetermined statement, it is determined that the pixel p00 is an invalid pixel, the data of the pixel p00 is not written to the address 0 of the memory 200, and at the same time, the address of the memory 200 is accumulated (i.e., accumulated by one address) as address 1. Next, at the next time point, the current pixel p01 is judged. If the pixel p01 is determined to be an invalid pixel, the data of the pixel p01 is not written to the address 1 of the memory 200, and at the same time, the address of the memory 200 is accumulated as address 2. In this manner, according to the time point it is determined whether the pixel position (y,x) of the current pixel conforms to the second predetermined statement, and the address of the memory 200 is continuously accumulated. When the current pixel at the time point is determined to be a valid pixel, the pixel is written to the address currently accumulated in the memory 200. When the current pixel at the time point is determined to be an invalid pixel, the pixel is not written to the memory 200, but the address of the memory 200 is still continuously accumulated. Accordingly, the data of the valid pixels p11-p15, p21-p25, p31-p35, p41-p45 and p51-p55 of the input image 100 are sequentially written to the target address of the memory 200. The target addresses to be written include: address 8 to address 12, address 15 to address 19, address 22 to address 26, address 29 to address 33, and address 36 to address 40.

In another example of the data processing method in FIG. 2, the write operation is performed according to the mapping relationship between the pixel position (y,x) of the pixel of the input image 100 and the target address to be written in the memory 200, and according allocation of the target address to be written in the memory 200. In the embodiment of FIG. 2, the pixel position (y,x) is directly mapped to the target address to be written in the memory 200, and the mapping relationship is as follows: the pixel positions (1,1)-(1,5) of the row L1 of the input image 100 are directly mapped to the target address 8-12 to be written in the second horizontal row of the memory 200, the pixel positions (2,1)-(2,5) of the row L2 of the input image 100 are directly mapped to the target address 15-19 to be written in the third horizontal row of the memory 200, the pixel positions (3,1)-(3,5) of the row L3 of the input image 100 are directly mapped to the target address 22-26 to be written in the second horizontal row of the memory 200, the pixel positions (4,1)-(5,5) of the row L4 of the input image 100 are directly mapped to the target address 29-33 to be written in the second horizontal row of the memory 200, and the pixel positions (5,1)-(5,5) of the row L5 of the input image 100 are directly mapped to the target address 36-40 to be written in the second horizontal row of the memory 200. The meaning of the above-mentioned direct mapping relationship is that, the target address to be written to the memory 200 is directly related to the allocation of the pixel positions (y,x) in the input image 100.

For the target address to be written to the memory 200, the allocation of the target address may be defined according to the first address allocation relation. The first address allocation relation is shown in equation (3):

$$W\_Addr = Addr\_st + y \times wid\_img + x \qquad (3)$$

The terms of the equation (3) are defined as follows. The "current write address W_Addr" is the address where the current pixel W_p is written to the memory 200. The "starting write address Addr_st" is the address where the first valid pixel p11 of the input image 100 is written to the memory 200. The "valid width wid_img" is the valid width of the input image 100. "pixel position y" is the position where the pixel position (y,x) of the current pixel W_p corresponds to the row Ly. "pixel position x" is the position where the pixel position (y,x) of the current pixel W_p corresponds to the column Cx.

When the write operation is performed, it is determined whether the pixel position (y,x) of the current pixel W_p conforms to the second predetermined statement according to the time point. When the current pixel W_p conforms to the second predetermined statement and is determined to be a valid pixel, according to the mapping relationship between the pixel position (y,x) and the target address to be written in the memory 200, and refer to the first address allocation relation of equation (3), the current pixel W_p is written to the current write address W_Addr. For example, the current pixel W_p is the pixel p33, the pixel position (3,3) of the pixel p33 conforms to the second predetermined statement of the equation (2), and the pixel p33 is determined to be an valid pixel. According to the mapping relationship, the pixel position (3,3) is mapped to the address 24 of the memory 200, and the current pixel p33 may be written to the current write address W_Addr=24, of the memory 200, with reference to the first address allocation relation of equation (3). Accordingly, the valid pixels p11-p15, pixels p21-p25, pixels p31-p35, pixels p41-p45 and pixels p51-p55 are sequentially written to addresses 8-12, addresses 15-19, addresses 22-26, addresses 29-33 and addresses 36-40.

On the other hand, when the data written in the memory 200 is to be read, the read operation of the data processing method is performed, and the read operation includes sequential reading and random reading. The read operation can be performed according to the mapping relationship between the pixel position (y,x) and the target address to be written in the memory 200, and with reference to the first address allocation relation in equation (3).

On the other hand, according to the mapping relationship of the target address to be written, the addresses 8-12 of the second horizontal row, the addresses 15-19 of the third horizontal row, the addresses 22-26 of the fourth horizontal row, the addresses 29-33 of the fifth horizontal row and the address 36-40 of the sixth horizontal row store the data of the valid pixels, then read operation is performed on the addresses 8-12, addresses 15-19, addresses 22-26, addresses 29-33 and addresses 36-40. For example, when the read operation is performed on the addresses 8-12 of the second horizontal row, referring to the first address allocation relation in equation (3), it is obtained that the data read from the address 8 is the data of the pixel p11 at the position (1,1), and the data read from the address 9 is the data of the pixel p12 at the pixel position (1,2), and so on.

Figure 3:
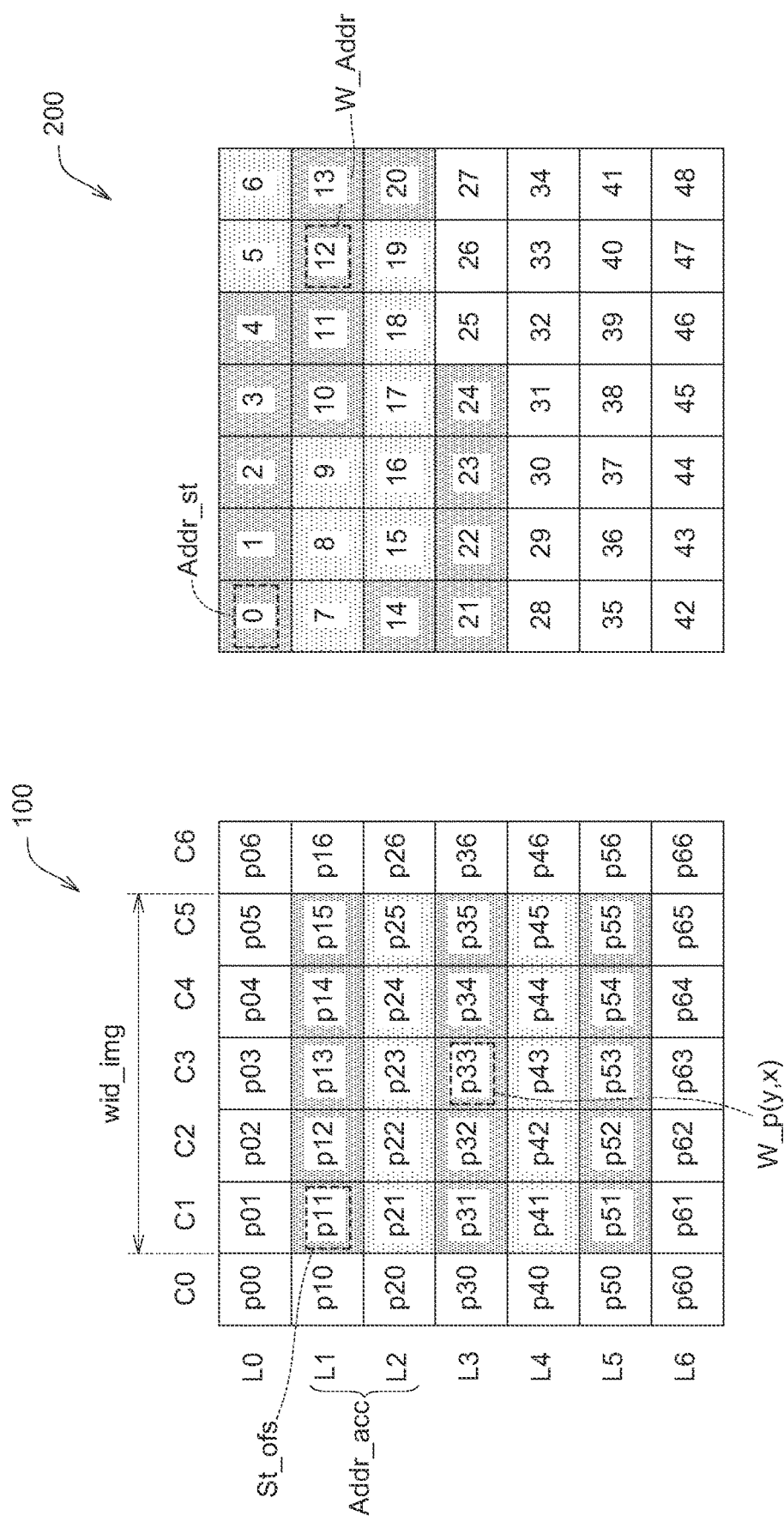
FIG. 3 is a schematic diagram illustrating a data processing method according to a second embodiment of the present disclosure.

FIG. 3 is a schematic diagram illustrating a data processing method according to a second embodiment of the present disclosure. Compared with the direct mapping relationship between the pixel position (y,x) and the target address to be written in the memory 200 in the embodiment in FIG. 2, in the embodiment in FIG. 3 the target address to be written to is allocated as a tightly consecutive address, so as to save the usage of the memory 200.

The mapping relationship between the pixel position (y,x) and the target address to be written in the memory 200 of the embodiment in FIG. 3 is as follows: when the starting write address Addr_st of the memory 200 is address 0, the 25 valid pixels p11-p15, p21-p25, p31-p35, p41-p45 and p51-p55 of the input image 100 are mapped to consecutive addresses 0-24. More specifically, the pixel positions (1,1)-(1,5) of the row L1 in the valid region R1 are mapped to the addresses 0-4 of the memory 200, the pixel positions (2,1)-(2,5) of the row L2 in the valid region R1 are mapped to the addresses 5-9 of the memory 200, the pixel positions (3,1)-(3,5) of the row L3 in the valid region R1 are mapped to the addresses 10-14 of the memory 200, the pixel positions (4,1)-(4,5) of the row L4 in the valid region R1 are mapped to the addresses 15-19 of the memory 200, the pixel positions (5,1)-(5,5) of the row L5 in the valid region R1 are mapped to the addresses 20-24 of the memory 200.

Moreover, in the embodiment of FIG. 3, the data amount of each of the pixels p00-p66 of the input image 100 is one byte (i.e., 8 bits), and each of the addresses 0-48 of the memory 200 corresponds to a storage space of one byte. That is, the data amount of each of pixels p00-p66 is equal to the storage space corresponding to each of addresses 0-48. For the target address to be written to the memory 200 of the embodiment of FIG. 3, the allocation method of the target address can be defined according to the second address allocation relation. The second address allocation relation is shown in equation (4):

$$W\_Addr = Addr\_st + Addr\_acc - St\_ofs + x \quad (4)$$

The terms of the equation (4) are defined as follows. The "current write address W_Addr" is the address where the current pixel W_p is written to the memory 200. The "starting write address Addr_st" is the address at which the first valid pixel p11 of the input image 100 is written to the memory 200. "pixel position x" is the position where the pixel position (y,x) of the current pixel W_p corresponds to the column Cx. The "accumulation address Addr_acc" is equal to the total number of written pixels in all rows before the row where the current pixel W_p is located (excluding the number of pixels in the row where the current pixel W_p is located). The "starting offset St_ofs" is the position offset of the first valid pixel of each row of the input image 100 with respect to the first pixel p00 of each row of the input image 100. According to the above definition, in the embodiment of FIG. 3, the current pixel W_p is, for example, the pixel p33, and the pixel position of the pixel p33 is x=3. The starting write address Addr_st is, for example, address 0 of the memory 200 (i.e., Addr_st=0). The total number of pixels p11-p15 and p21-p25 is 10, these pixels are included in the row L1 and the row L2 which have been written before the current pixel W_p, hence, the accumulation address Addr_acc=10. The starting offset St_ofs is the offset of the first valid pixel of each row relative to the pixel position of the first pixel p00, for example, the starting offset St_ofs of the row L1 is 1. The current write address W_Addr=12 (i.e., 12=0+10−1+3) can be calculated according to the second address allocation relation in equation (4). The second address allocation relation of equation (4) can be generated according to the second predetermined statement of equation (2). Wherein, the starting offset St_ofs of each row of the valid pixels of the input image 100 and the accumulation address Addr_acc of each row are obtained according to the second predetermined statement of equation (2), and then, second address allocation relation of equation (4) is obtained according to the starting offset St_ofs of each row and the accumulation address Addr_acc.

When the write operation is performed, it is determined whether the pixel position (y,x) of the current pixel W_p conforms to the second predetermined statement according to the time point. When the current pixel W_p conforms to the second predetermined statement and is determined to be a valid pixel, the current pixel W_p is written to the current write address W_Addr according to the second address allocation relation of equation (4). For example, the current pixel W_p is the pixel p33, and its pixel position (3,3) conforms to the second predetermined statement of the equation (2), pixel p33 is determined as a valid pixel. According to the mapping relationship of the target address to be written, it is obtained that the pixel position (3,3) is mapped to the address 12 of the memory 200, and the current pixel p33 is written to the current write address W_Addr (W_Addr=12) of the memory 200, with reference to the second address allocation relation of equation (4).

In another example, the write operation of the data processing method in FIG. 3 does not need to consider mapping relationship between the pixel position (y,x) and the target address to be written in the memory 200 or the second address allocation relation of equation (4). When the current pixel W_p conforms to the second predetermined statement and is determined to be a valid pixel, starting from the starting write address Addr_st, the valid pixel W_p is continuously written to the memory 200. For example, the pixel p11 is determined to be a valid pixel because it conforms to the second predetermined statement, and the pixel p11 is written to the starting write address Addr_st=0. Then, the next pixel p12 also satisfies the second predetermined statement and is determined to be a valid pixel, and the pixel p12 is written to the next address 1 of the starting write address Addr_st, and so on. When the pixels p16 and p20 do not meet the second predetermined statement and are determined to be invalid pixels, the pixels p16 and p20 are not written to the memory 200. Next, the pixel p21 is determined to be a valid pixel because the pixel p21 meets the second predetermined statement, and the pixel p21 is written to the memory 200, and so on.

In another example, the valid region R1 may be defined according to a look-up table. Compared with the data of the pixels stored in the memory 200, the amount of data of the look-up table is smaller, hence the look-up table can be created in another memory (not shown in the figure) other than the memory 200. For example, if the memory 200 is a DRAM, the look-up table can be established in a static random access memory (SRAM) other than the DRAM. The valid pixels of the input image 100 in FIG. 3 are: pixel p11~pixel p15, pixel p21~pixel p25, pixel p31~pixel p35, pixel p41~pixel p45 and pixel p51~pixel p55. The valid region R1 can be defined according to the look-up table shown in Table 1, and the valid pixels can be determined accordingly:

TABLE 1

|    | Offset (ofs) | Valid width (wid) |
|----|--------------|-------------------|
| L0 | 0            | 0                 |
| L1 | 1            | 5                 |
| L2 | 1            | 5                 |
| L3 | 1            | 5                 |
| L4 | 1            | 5                 |
| L5 | 1            | 5                 |
| L6 | 0            | 0                 |

In the look-up table of Table 1, "offset ofs" is the offset of the pixel position x of the first valid pixel of each row of the input image 100, and "valid width wid" is equal to the total number of valid pixels included in each row. For example, row L0 does not include valid pixels, hence the offset ofs is 0 for row L0 (alternatively, the offset ofs for row L0 can be given any value) and the valid width wid is 0. Similarly, row L6 does not include valid pixels, hence the offset ofs is 0 for row L6 (alternatively, the offset ofs for row L6 can be given any value) and the valid width wid is 0. In addition, the offset ofs is 1 of the pixel position x=1 of the first valid pixel p11 of the row L1, and the row L1 includes five valid pixels p11-p15, hence the row L1 has valid width wid=5. Similarly, the offset ofs=1 and the valid width wid=5, for each of rows L2-L5.

In an example of the data processing method shown in FIG. 3, a write operation may be performed according to the look-up table in Table 1 to write the data of the valid pixels in the valid region R1 to the corresponding addresses of the memory 200. For example, Table 1 records the offset ofs=1 and the valid width wid=5, for the row L1, it can be obtained that the five valid pixels p11-p15 of the current row L1 are to be written to the memory 200. According to the mapping relationship between the pixel position (y,x) and the target address to be written in the memory 200, it is obtained that the pixels p11-p15 are mapped to the addresses 0-4 of the memory 200. The current write address W_Addr=0 which corresponds to the pixel p11, the current write address W_Addr=1 which corresponds to the pixel p12, the current write address W_Addr=2 which corresponds to the pixel p13, the current write address W_Addr=3 which corresponds to the pixel p14, and the current write address W_Addr=4 which corresponds to the pixel p15, can be obtained by referring to the second address allocation relation in equation (4). Next, the offset ofs=1 and the valid width wid=5, for the next row L2, it can be obtained that the five valid pixels p21-p25 of the current row L2 are to be written to the memory 200. According to the mapping relationship between the pixel position (y,x) and the target address to be written in the memory 200, the pixels p21-p25 are mapped to addresses 5-9 of the memory 200. Referring to the second address allocation relation in equation (4), the current write addresses W_Addr=5, 6, 7, 8 and 9 corresponding to the pixels p21-p25, are obtained.

In another example, the write operation does not need to consider the mapping relationship between the pixel position (y,x) and the target address to be written in the memory 200, or the second address allocation relation in equation (4), but according to offset ofs and the valid width wid of the current row recorded in Table 1, and the valid pixels of the row are continuously written to the memory 200.

On the other hand, when a read operation is performed, the look-up table of Table 1 can be established according to the second predetermined statement of equation (2). Then, according to the look-up table in Table 1, it is converted to the second address allocation relation of equation (4), and the data of the corresponding pixel is read out from the address W_Addr. For example, when read operation is performed on the address W_Addr=12, according to the look-up table in Table 1 and the equation (4), it is known that the data read at the address W_Addr=12 is the data of the pixel p33. In another example of the read operation, the look-up table of Table 1 is already established, then the look-up table of Table 1 is directly considered from another memory (e.g., SRAM), and the read operation is performed with reference to equation (4).

When the valid region of the input image has a regular shape, the valid region can be defined according to the predetermined statement of the pixel position (y, x) (for example, the second predetermined statement of equation (2)), or can be defined according to the lookup table (for example, offset ofs and the valid width wid in Table 1) so as to define the valid region. In other examples, when the valid region has an irregular shape, it may be more appropriate to define such a valid region with a look-up table.

Figure 4:
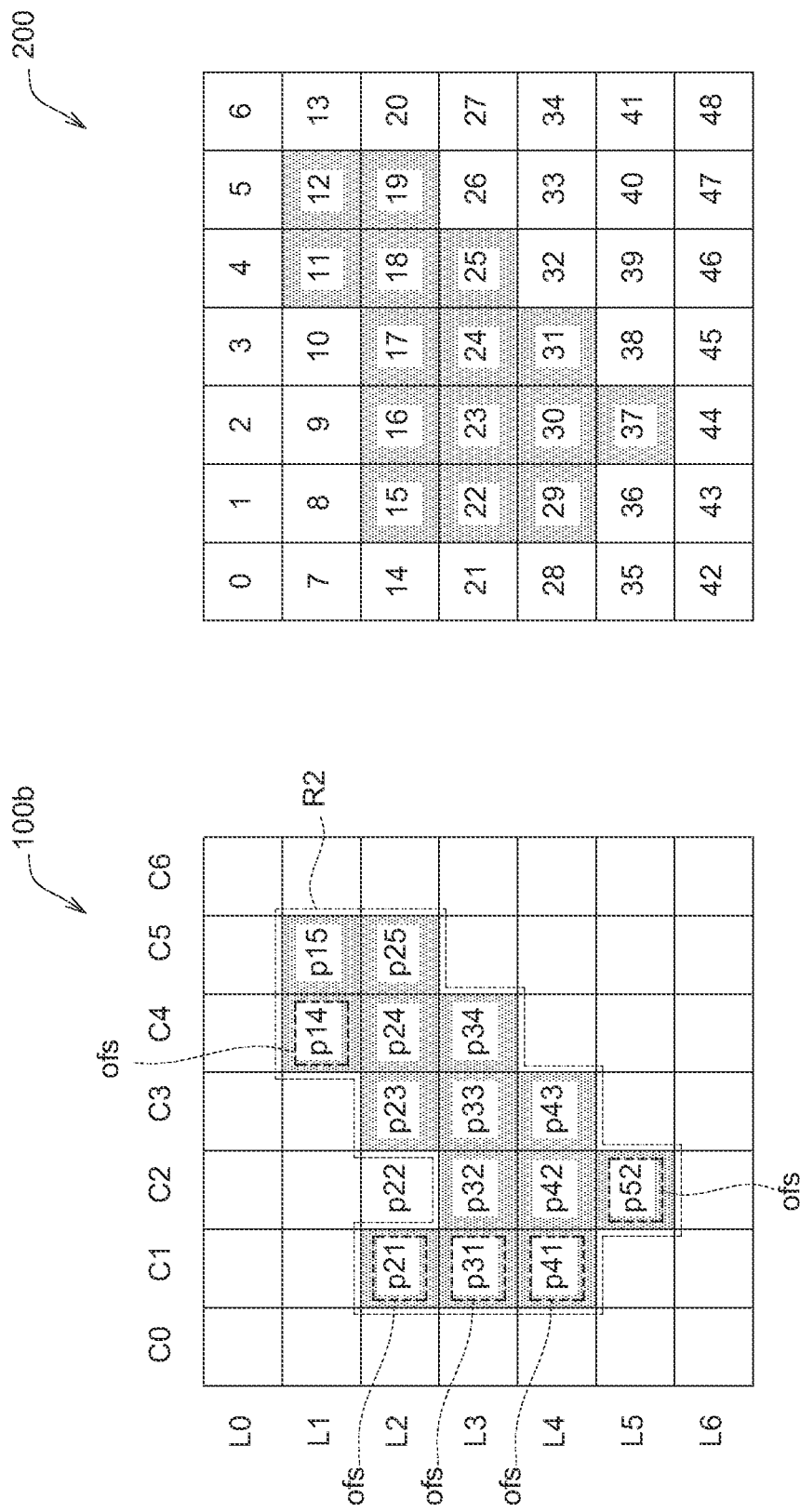
FIG. 4 is a schematic diagram illustrating the data processing method of the third embodiment of the present disclosure.

FIG. 4 is a schematic diagram illustrating the data processing method of the third embodiment of the present disclosure. The valid region R2 of the input image 100b of this embodiment has an irregular shape, and it is more suitable to define the valid region R2 with a look-up table. The valid region R2 includes pixels p14 and p15 in row L1, pixels p21 and p23-p25 in row L2, pixels p31-p34 in row L3, pixels p41-p43 in row L4 and pixel p52 in row L5. Also, the pixel p22 is located in a "recess" of the valid region R2, but the pixel p22 does not belong to the valid region R2. However, when calculating the valid width wid of the row L2, the pixel p22 is taken into consideration, hence the valid width wid=5, for the row L2. The valid region R2 can be defined according to the look-up table shown in Table 2:

TABLE 2

|    | Offset (ofs) | Valid width (wid) |
|----|--------------|-------------------|
| L0 | 0            | 0                 |
| L1 | 4            | 2                 |
| L2 | 1            | 5                 |
| L3 | 1            | 4                 |
| L4 | 1            | 3                 |
| L5 | 2            | 1                 |
| L6 | 0            | 0                 |

In the look-up table of Table 2, the offset ofs=0 and the valid width wid=0, for the row L0, indicating that the row L0 does not include valid pixels. The offset ofs=4 and the valid width wid=2, for the row L1, indicating that the row L1 includes two valid pixels p14 and p15, and the offset of the pixel position x of the first valid pixel p14 of the row L1 is 4. Similarly, the offset ofs=1 and valid width wid=5, for row L2, are recorded in Table 2. It indicates that row L2 includes four valid pixels p21, p23, p24 and p25 (pixel p22 is not a valid pixel, but the pixel p22 is considered when the valid width wid is calculated), and the offset is 1 for the pixel position x of the first valid pixel p21 of the row L2, and so on.

In the embodiment of FIG. 4, the pixel position (y,x) is directly mapped to the target address to be written to the memory 200 (i.e., the target address to be written to the memory 200 is directly related to the distribution of the pixel positions (y,x) in the input image 100b), the mapping relationship of the target address to be written is as follows: the pixel positions (1, 4) and (1,5) of the valid pixels of the row L1 of the input image 100b are directly mapped to addresses 11 and 12 of the second horizontal row of the memory 200. The pixel positions (2,1), (2,3), (2,4) and (2,5) of the valid pixels of the row L2 are directly mapped to the addresses 15, 17, 18 and 19. The pixel positions (3,1), (3,2), (3,3) and (3,4) of the valid pixels of the row L3 are directly mapped to the addresses 22, 23, 24 and 25. The pixel positions (4, 1), (4, 2) and (4, 3) of the valid pixels of the row L4 are directly mapped to the addresses 29, 30 and 31 of the third horizontal row of the memory 200. The pixel position (5, 2) of the valid pixel of L5 is directly mapped to the address 37 of the third horizontal row of the memory 200. In addition, the allocation method of the target address of the memory 200 is defined according to the first address allocation relation in equation (3).

In an example of the data processing method in FIG. 4, a write operation is performed to write the pixel data to the memory 200 according to the valid width wid of each row recorded in Table 2 (it is determined that the current row of the memory 200 should be written with address of corresponding width) and according to mapping relationship between (y, x) and the target address to be written in the memory 200, furthermore, with reference to the first address allocation relation in equation (3). For example, Table 2 records the valid width wid=0 for the row L0. It is known that the row L0 does not include valid pixels, so the memory 200 is not written. Next, Table 2 records the offset ofs=4 and the valid width wid=2 for the row L1, and it is known that the row L1 includes two valid pixels p14 and p15. According to the mapping relationship between the pixel position (y,x) and the target address to be written in the memory 200, it is known that the pixel p14 is mapped to the address 11 of the memory 200, and the pixel p15 is mapped to the address 12 of the memory 200. Then, with reference to the first address allocation relation of equation (3), the data of the pixels p14 and p15 are written to the addresses 11 and 12. Subsequent rows L2-L5 are performed with write operations in the same manner.

On the other hand, in an example of the data processing method shown in FIG. 4, the write operation may not be based on the mapping relationship between the pixel position (y,x) and the target address to be written in the memory 200 and does not need to refer the first address allocation relation in equation (3), but it's based on the valid width wid of each row recorded in Table 2, the current row should be written to the address of corresponding width of the memory 200. The current write address continues to accumulate. For example, Table 2 records the valid width wid=0 for row L0, and it can be determined that seven pixels in row L0 are all invalid pixels, so the seven pixels in row L0 are not written to the memory 200, but the current write address in the memory 200 is accumulated as "6". Next, Table 2 records the offset ofs=4 and the valid width wid=2 for the row L1. It can be judged that the first four pixels of the row L1 are invalid pixels and are not written to the memory 200, but the current write address of the memory 200 still continues to accumulate as "10". In addition, if the pixels p14 and p15 of the row L1 are valid pixels, the pixels p14 and p15 are written to the next two addresses 11 and 12 of the currently accumulated address 10. Next, the last pixel of the row L1 is determined to be an invalid pixel and is not written to the memory 200, but the current write address of the memory 200 is accumulated as "13". Subsequent rows L2-L5 perform write operations in the same manner.

Figure 5:
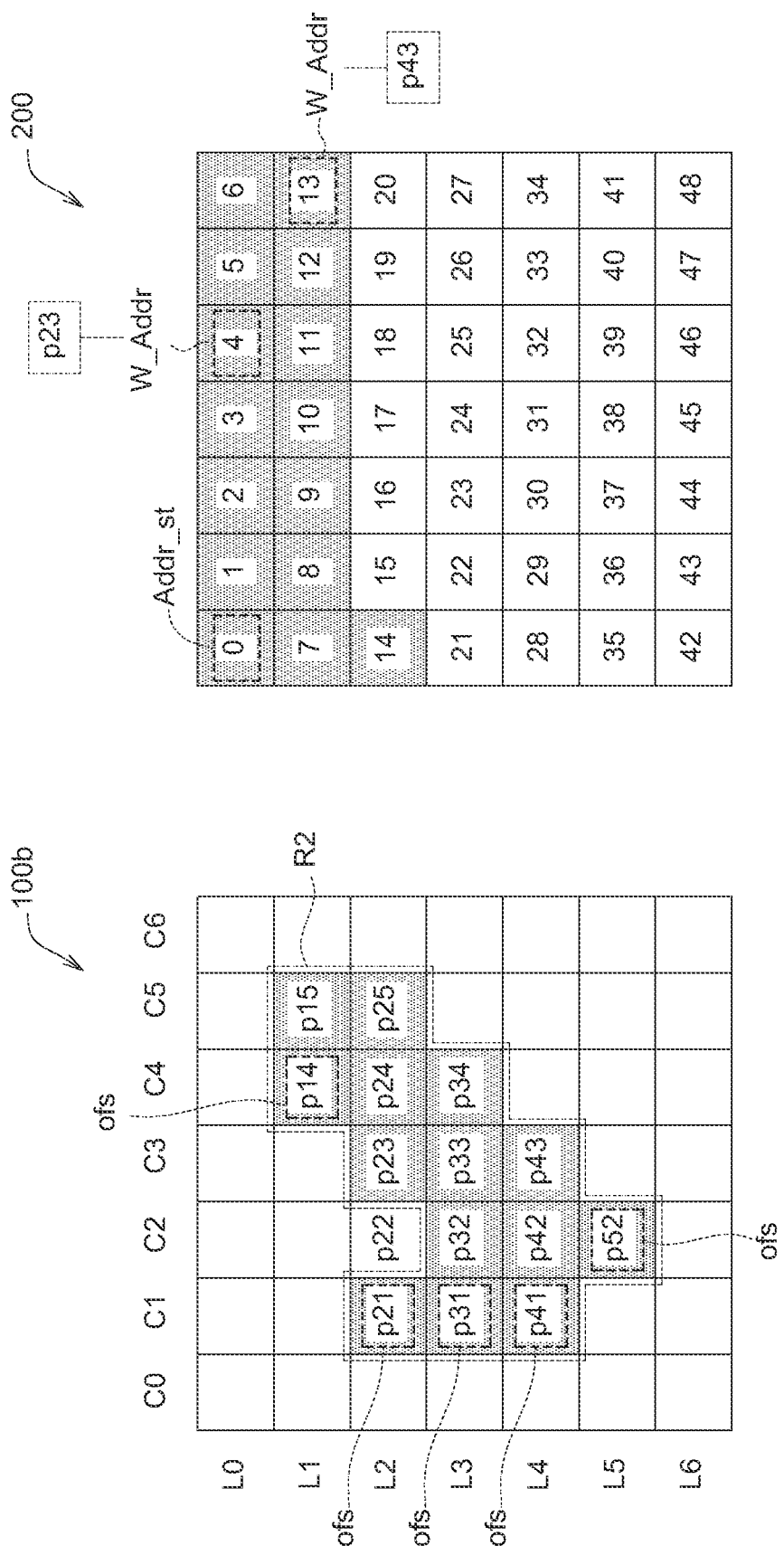
FIG. 5 is a schematic diagram of the data processing method of the fourth embodiment of the present disclosure.

FIG. 5 is a schematic diagram of the data processing method of the fourth embodiment of the present disclosure. Compared with the mapping relationship between the pixel position (y,x) and the target address to be written in the memory 200 in the embodiment in FIG. 4 which is a direct mapping relationship, in the embodiment in FIG. 5 corresponding addresses of the memory 200 are allocated as tightly contiguous addresses, so as to save the usage of the memory 200. The mapping relationship between the pixel position (y, x) and the target address to be written in the memory 200 of the embodiment in FIG. 5 is as follows: when the starting write address Addr_st of the memory 200 is address 0, the 14 valid pixels p14, p15, p21, p23-p25, p31-p34, p41-p43 and p52 of the input image 100b are mapped to consecutive target addresses 0-14 which are to be written. In addition, in the embodiment of FIG. 5, the valid region R2 of the input image 100b can be defined by the look-up table in Table 2, so as to determine whether it is valid pixel, and determine the current valid width wid according to the valid width wid of each row recorded in Table 2.

In an example, according to the valid width wid of each row recorded in Table 2 and the mapping relationship between the pixel position (y,x) and the target address of the memory 200, and according to conversion from Table 2 to the second address allocation relation in equation (4) to perform the write operation. For example, Table 2 records the offset ofs=4 and the valid width wid=2 of the row L1. It is known that the row L1 includes two valid pixels p14 and p15. Therefore, the current corresponding width is "2" for the row L1 that should be written to the memory 200 (i.e., should be written for two addresses). According to the mapping relationship between the pixel position (y, x) and the target address to be written in the memory 200, it is known that the pixel p14 is mapped to the address 0 of the memory 200, and the pixel p15 is mapped to the address 1 of the memory 200. The data of the pixels p14 and p15 can be written to the addresses 0 and 1 with reference to the second address allocation relation of the equation (4).

On the other hand, when the read operation is performed, it is performed according to the second address allocation relation in Table 2 and equation (4). For example, according to Table 2 and equation (4), the data of pixel p23 is read from the address W_Addr=4 of the memory 200, and the data of pixel p43 is read from the address W_Addr=13.

In another example, the write operation does not need to be based on the mapping relationship between the pixel position (y, x) and the target address to be written in the memory 200 and the second address allocation relation in equation (4). Instead, the write operation is according to the valid width wid of each row recorded in Table 2, to directly decide the current row should be written with address of the corresponding width of the memory 200, so as to continuously write to the memory 200. For example, if the offset ofs=4 and the valid width wid=2 of the column L1, the two valid pixels p14 and p15 of the row L1 are continuously written to the two consecutive addresses 0 and 1 of the memory 200.

The look-up table shown in Table 3 is also used to define the valid region R2 of the input image 100b, for embodiment of FIG. 5. In Table 3, it is recorded the "accumulation address Addr_acc" corresponding to each row of the input image 100b, instead of recording the "valid width wid".

TABLE 3

| | Offset (ofs) | Accumulation address (Addr_acc) |
|---|---|---|
| L0 | 0 | N/A |
| L1 | 4 | 0 |
| L2 | 1 | 2 |
| L3 | 1 | 7 |
| L4 | 1 | 11 |
| L5 | 2 | 14 |
| L6 | 0 | N/A |

The meaning of the "accumulation address Addr_acc" recorded in Table 3 is: the accumulated address corresponding to the previous row for the currently written row of the input image 100b. For example, for the currently written row L1, the accumulated address Addr_acc of the previous row L0 is "N/A", where "N/A" can be a specific value (such as a negative number or a positive maximum value) defined by the user. Or, the accumulated address Addr_acc of row L0 can be set to "0" (it can be obtained by subtracting the accumulated address Addr_acc of row L2 from the accumulated address Addr_acc of row L1, as a result of "0"), indicating that the row L0 does not include valid pixels, so pixels of the row L0 are not written to memory 200. Therefore, the accumulated address Addr_acc=0 corresponding to the row L1 recorded in Table 3.

Similarly, for the currently written row L2, the two valid pixels p14 and p15 of the previously written row L1 are written to the address 0 and the address 1, so the accumulated address corresponding to the row L2 is "address 2". Therefore, the accumulated address Addr_acc corresponding to the row L2 recorded in Table 3 is "Addr_acc=2". For the currently written row L3, the five valid pixels p21-p25 of the previously written row L2 are written to the addresses 2-6, so the accumulated address Addr_acc is "7" corresponding to the row L3 recorded in Table 3.

When the write operation of the memory 200 is actually performed, the address of the memory 200 can be calculated according to the look-up table in Table 3. Table 3 records the offset ofs=4 of the row L1, the accumulation address Addr_acc=0 of the row L1, and the accumulation address Addr_acc=2 of the next row L2. The difference between the accumulated address Addr_acc of the current row L1 and the accumulated address Addr_acc of the next row L2 is "2". Accordingly, for the valid pixels of the row L1, starting from the pixel p14 with the offset ofs=4, the data of the two pixels p14 and p15 are continuously written to the addresses 0 and 1 of the memory 200.

Similarly, for the row L2, Table 3 records the offset ofs=1 of the row L2, the accumulation address Addr_acc=2 of the row L2, and the accumulation address Addr_acc=7 of the next row L3. The difference is "5", that is between the accumulated address Addr_acc of the current row L2 and the accumulated address Addr_acc of the next row L3. Accordingly, starting from the pixel p21 with the offset ofs=1, the data of the five pixels p21-p25 are continuously written to the addresses 2-6 of the memory 200.

On the other hand, when the data of the memory 200 is to be read, the read operation can be performed according to the look-up table in Table 3. For example, when the data of the pixel p23 been written to the memory 200 is to be read, the corresponding row in Table 3 is queried by using the pixel position "y" of the pixel p23 as an index. The pixel position of the pixel p23 is "y=2", the index is "2", and the offset ofs=1 and the accumulated address Addr_acc=2 of the row L2 recorded in Table 3 are queried. Then, the offset ofs=1, the accumulated address Addr_acc=2, and the pixel position x=3 are applied to the second address allocation relation of the equation (4). Wherein, the offset ofs=1 is applied to the starting offset St_ofs of the equation (4), and the starting write address Addr_st=0 in the equation (4). Accordingly, it is calculated that the address W_Addr=4 (i.e., 4=2-1+3) of the pixel p23 been written to the memory 200. Then, the read operation is actually performed, and the data of the pixel p23 is read out from the address 4 of the memory 200.

Similarly, in another example, when the data of the pixel p43 written in the memory 200 is to be read, the pixel position y=4 of the pixel p43 is used as an index to query from Table 3: for the row L4, offset ofs=1 and accumulation address Addr_acc=11. Then, the offset ofs=1, the accumulative address Addr_acc=11, and the pixel position x=3, are applied to the second address allocation relation of equation (4), and the address W_Addr=13 where the pixel p43 has been written to the memory 200, is calculated (i.e., 13=11-1+3). Then, the read operation is actually performed, and the data of the pixel p43 is read out from the address 13 of the memory 200.

Figure 6:
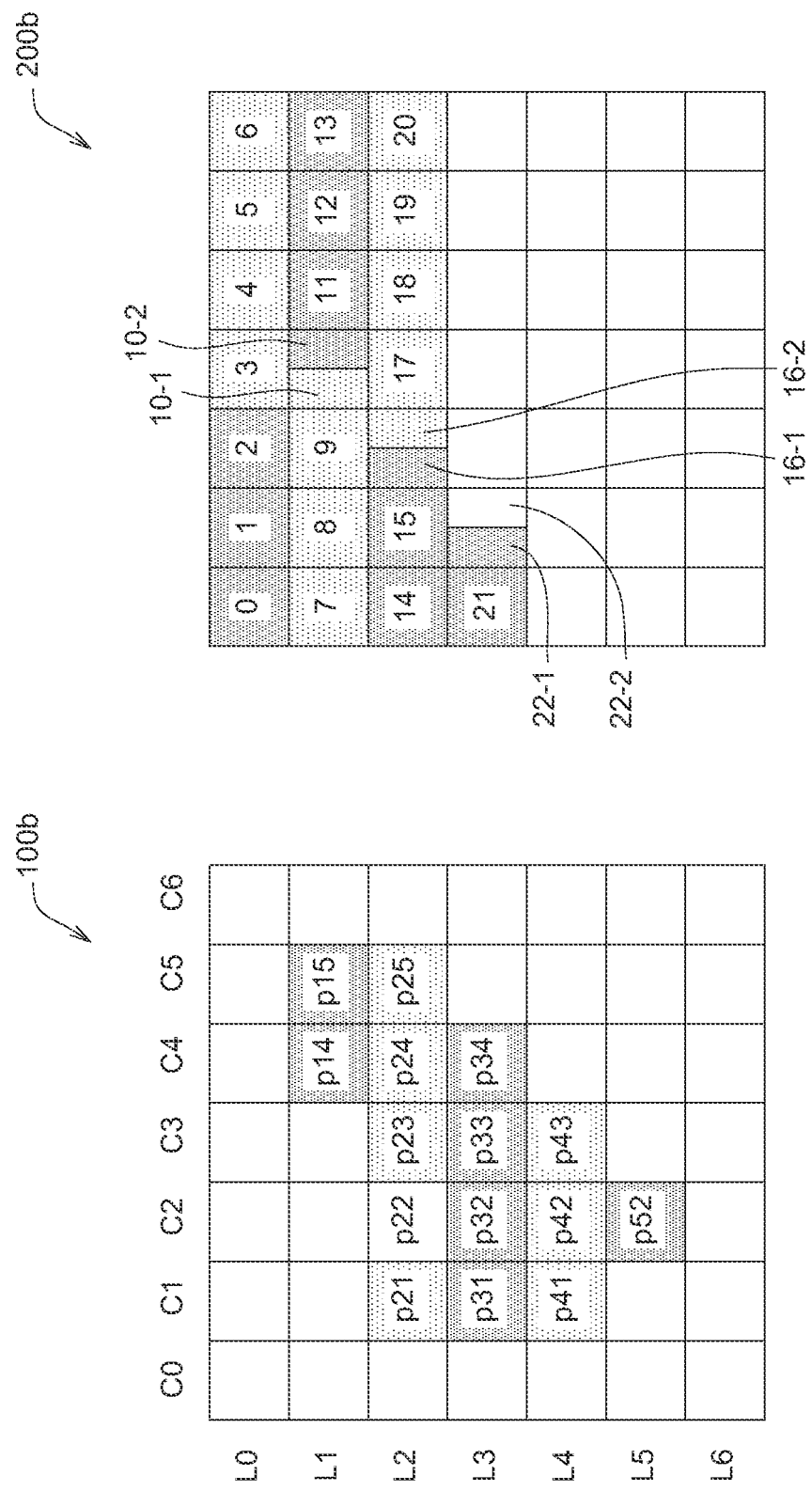
FIG. 6 is a schematic diagram of the data processing method in the fifth embodiment of the present disclosure.

FIG. 6 is a schematic diagram of the data processing method in the fifth embodiment of the present disclosure. This embodiment is similar to the embodiment in FIG. 5, the difference is that the number of bits of the data amount of each pixel of the input image 100b is not equal to the bits of storage space of the memory 200b. For example, the data amount of each pixel is 12 bits, and the storage space corresponding to each address of the memory 200b is 8 bits. The present embodiment performs the write operation according to the "bit package mode", so as to write the data of the valid pixels of the input image 100b to the corresponding addresses of the memory 200b. The write operation of this embodiment may be performed according to the look-up table of Table 4.

TABLE 4

| | Offset (ofs) | Accumulation address (Addr_acc) |
|---|---|---|
| L0 | 0 | N/A |
| L1 | 4 | 0 |
| L2 | 1 | 3 |
| L3 | 1 | 10 |
| L4 | 1 | 16 |
| L5 | 2 | 21 |
| L6 | 0 | N/A |

The accumulation address Addr_acc=0 for the row L1, is recorded in Table 4, and it indicates that the valid pixels of the row L1 are written from the address 0 of the memory 200b. The data of the two pixels p14 and p15 of the row L1 have total "24 bits", which are sequentially written to the three addresses 0-2 of the memory 200b. The accumulation address Addr_acc=3 of the row L2 recorded in Table 4, indicates that the valid pixels of the row L2 are written from the address 3 of the memory 200b. The data of the five pixels p21-p25 of the row L2 have total "60 bits", which are sequentially written to the partial storage space 10-1 corresponding to the seven addresses 3-9 of the memory 200b and partial storage space 10-1 of the next address 10 (that is, the first 4-bits stored at address 10).

The accumulation address Addr_acc=10 of the row L3 recorded in Table 4, indicates that the data (48 bits in total) of the four valid pixels p31-p34 of the row L3 are written from the address 10 of the memory 200b, which are written to the partial storage space 10-2 corresponding to address 10 (i.e., the last 4 bits stored at address 10), addresses 11-15, and the partial storage space 16-1 corresponding to address 16 (i.e., the first 4 bits stored at address 16). Similarly, the accumulation address Addr_acc=16 of row L4 recorded in Table 4, and the data (36 bits in total) of the three valid pixels p41-p43 of row L4 are sequentially written to the memory 200b corresponding to the partial storage space 16-2 of address 16 (i.e., the last 4 bits stored at address 16) and addresses 17-20. The accumulation address Addr_acc=21 of row L5 recorded in Table 4, and the data (8 bits in total) of the valid pixel p52 of row L5 is written to the partial storage space 22-2 corresponding to the address 22 of the memory 200b (i.e., the first 4 bits stored at address 22).

In the embodiment of FIG. 6, the write operation and the read operation can also be performed according to the configuration of the target address of the memory 200. The target address of the embodiment in FIG. 6 is configured according to the third address allocation relation, and the third address allocation relation is shown in equation (5):

$$W\_Addr = Addr\_st + (Addr\_acc - St\_ofs + x) \times byte\_per\_pixel \quad (5)$$

The number of bytes of the data amount of each pixel of the input image 100 is defined as "byte_per_pixel". For example, if the data amount of each pixel of the input image 100 is 12 bits, the number of bytes of each pixel byte_per_pixel=1.5. When writing to the pixel p21 of the row L2, the value of each item is brought to the third address allocation relation of equation (5): the pixel position x=1 of the pixel p21, the starting address Addr_st is "0" for writing of the memory 200b, the starting offset St_ofs=1 of row L2, the accumulated address Addr_acc=2 of row L2 (i.e., before row L2, the two pixels p14, p15 of row L1 have been written). Accordingly, the current write address W_Addr=3 (i.e., 0+(2−1+1)×1.5=3) of the pixel p21 is calculated from the equation (5), then the pixel p21 is written to the address 3 of the memory 200b.

When the pixels of the input image 100b are of different data types, the data amount of each pixel is a different number of bits. For example, when the data type of the input image 100b is 8-bit grayscale, the data amount of each pixel is 8 bits, and the number of bytes of each pixel is byte_per_pixel=1. When the data type of the input image 100b is 12-bit grayscale, the data amount of each pixel is 12 bits, and the number of bytes of each pixel is byte_per_pixel=1.5. When the data type of the input image 100b is the YUY2 format, the data amount of each pixel is 16 bits, and the number of bytes of each pixel is byte_per_pixel=2. When the data type of the input image 100b is RGB24 format, the data amount of each pixel is 24 bits, and the number of bytes of each pixel is byte_per_pixel=3. From the above, when the input image 100b is in grayscale 8-bit, grayscale 12-bit, YUY2 format or RGB24 format of different data types, it can be applied to the equation (5) according to the corresponding number of bytes "byte_per_pixel". The write operation and the read operation are performed according to the third address allocation relation of equation (5).

Figure 7:
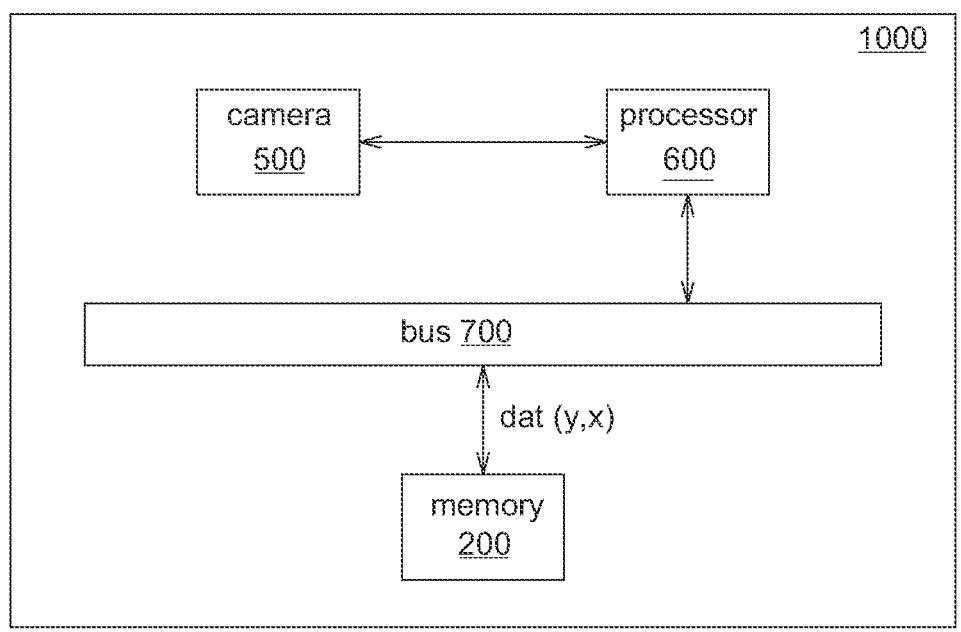
FIG. 7 is a schematic diagram of a data processing system according to an embodiment of the present disclosure.

FIG. 7 is a schematic diagram of a data processing system 1000 according to an embodiment of the present disclosure. The data processing system 1000 is used to execute the data processing methods of respective embodiments shown in FIGS. 2-6. The data processing system 1000 includes a camera 500, a processor 600, a memory 200 and a bus 700. The camera 500 is used for generating the input image 100 (or the input image 100b). The input image 100 has a plurality of pixels, and each pixel has a pixel position (y,x) in the input image 100.

The processor 600 may be provided independently of the camera 500. Alternatively, the processor 600 may be disposed inside the camera 500 (the processor 600 is built-in for the camera 500). The processor 600 performs real-time operation, online operation or offline operation to obtain a predetermined statement of the pixel position (y,x) of the pixel, thereby defining the valid region R1 of the input image 100, and determining the valid pixels located in the valid region R1. Each valid pixel has valid data dat(y,x) of the input image 100. Alternatively, the processor 600 may create a look-up table for the input image 100, and the look-up table records the offset Ofs, valid width wid or cumulative address Addr_acc of each row, so as to define the valid region R1 of the input image 100.

The processor 600 determines whether the current pixel W_p among the pixels is one of the valid pixels. If the current pixel W_p is one of the valid pixels, the processor 600 performs a write operation to write the valid data dat(y,x) of the current pixel W_p to target address of memory 200 directly, or via the bus 700. The processor 600 allocates the target address according to the first address allocation relation in equation (3), the second address allocation relation in equation (4), or the third address allocation relation in equation (5).

When the target address is configured to be directly mapped to the pixel position of the valid pixel according to the first address allocation relation in equation (3), the processor 600 configures the target address according to the first address allocation relation in equation (3), and perform the write operation according to mapping relationship between the target address and the pixel position (y,x), the predetermined statement or the look-up table. Alternatively, when the target address is configured as a tightly continuous address according to the second address allocation relation of equation (4) or the third address allocation relation of equation (5), the processor 600 will perform write operation based on mapping relationship between the target address and the pixel position (y, x), the predetermined statement or the look-up table.

On the other hand, the processor 600 may execute the read operation according to the first address allocation relation, the second address allocation relation or the third address allocation relation, and according to the mapping relationship between the target address and the pixel position (y,x), the predetermined statement or the look-up table, and the valid data dat(y,x) written in the target address of the memory 200 is read out through the bus 700, or directly read out.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data processing method, comprising:
   receiving an input image generated by a camera, wherein the input image has a plurality of pixels and each of the pixels has a pixel position;
   defining a valid region in the input image, wherein a plurality of valid pixels among the pixels are located in the valid region, each of the valid pixels has a valid data, and a shape and an area of the valid region are related to an optical characteristic of the camera; and
   writing the valid data to a plurality of target addresses of the memory correspondingly according to a starting write address of a memory and a valid width of the input image, or according to the starting write address, a starting offset of the input image and an accumulation address of the memory.

2. The data processing method according to claim 1, further comprising:
allocating the target addresses according to a first address allocation relation or a second address allocation relation,
wherein, the first address allocation relation is related to the starting write address and the valid width, and the second address allocation relation is related to the starting write address, the starting offset and the accumulation address.

3. The data processing method according to claim 2, wherein, the step of writing the valid data to the target addresses of the memory correspondingly comprises:
determining whether a current pixel among the pixels has the valid data; and
when the current pixel has the valid data, writing the valid data of the current pixel to the corresponding target address according to the first address allocation relation.

4. The data processing method according to claim 3, further comprising:
reading the valid data stored in the target addresses of the memory according to the first address allocation relation.

5. The data processing method according to claim 2, wherein, the step of writing the valid data to the target addresses of the memory correspondingly comprises:
determining whether a current pixel among the pixels has the valid data;
when the current pixel has the valid data, writing the valid data of the current pixel to the corresponding target address according to the second address allocation relation; and
accumulating an address of the memory corresponding to the current pixel from the starting write address of the memory, and writing the valid data of the current pixel to the address which is currently accumulated so as to allocate the target addresses as consecutive addresses.

6. The data processing method according to claim 5, further comprising:
reading the valid data stored in the target addresses of the memory according to the second address allocation relation.

7. The data processing method according to claim 1, wherein, a boundary of the valid region is related to a predetermined statement, when the pixel position of a current pixel among the pixels conforms to the predetermined statement, the current pixel has the valid data.

8. The data processing method according to claim 1, wherein, the pixels are arranged in a plurality of rows in the input image, and a valid width of each of the rows or an accumulation address corresponding to each of the rows is recorded in a look-up table, it is determined whether a current pixel among the pixels has the valid data, and the valid data is written to the corresponding target address.

9. The data processing method according to claim 8, wherein, the memory is a dynamic random access memory (DRAM), and the look-up table is established in an external static random access memory (SRAM).

10. A data processing system, comprising:
a camera, for generating an input image, wherein the input image has a plurality of pixels, and each of the pixels has a pixel position;
a memory, having a plurality of target addresses; and
a processor, for defining a valid region in the input image, wherein a plurality of valid pixels among the pixels are located in the valid region, each of the valid pixels has a valid data, and a shape and an area of the valid region are related to an optical characteristic of the camera;
wherein, the processor is configured to write the valid data to a plurality of target addresses of the memory correspondingly according to a starting write address of the memory and a valid width of the input image, or according to the starting write address, a starting offset of the input image and an accumulation address of the memory.

11. The data processing system according to claim 10, wherein, the processor is configured to allocate the target addresses according to a first address allocation relation or a second address allocation relation, wherein the first address allocation relation is related to the starting write address and the valid width, and the second address allocation relation is related to the starting write address, the starting offset and the accumulation address.

12. The data processing system according to claim 11, wherein, the processor is configured to determine whether a current pixel among the pixels has the valid data, when the current pixel has the valid data, writing the valid data of the current pixel to the corresponding target address according to the first address allocation relation.

13. The data processing system according to claim 12, wherein, the processor is configured to read the valid data stored in the target addresses of the memory according to the first address allocation relation.

14. The data processing system according to claim 11, wherein, the processor is configured to determine whether a current pixel among the pixels has the valid data, when the current pixel has the valid data, write the valid data of the current pixel to the corresponding target address according to the second address allocation relation, and configured to accumulate an address of the memory corresponding to the current pixel from the starting write address of the memory, and write the valid data of the current pixel to the address which is currently accumulated so as to allocate the target addresses as consecutive addresses.

15. The data processing system according to claim 14, wherein, the processor is configured to read the valid data stored in the target addresses of the memory according to the second address allocation relation.

16. The data processing system according to claim 10, wherein, the pixels are arranged in a plurality of rows in the input image, and a valid width of each of the rows or an accumulation address corresponding to each of the rows is recorded in a look-up table, the processor is configured to read the valid data stored in the target addresses according to the look-up table.

17. The data processing system according to claim 16, wherein, a boundary of the valid region is related to a predetermined statement, and the look-up table is established according to the predetermined statement.

18. The data processing system according to claim 17, wherein, the memory is a dynamic random access memory (DRAM), and the look-up table is established in an external static random access memory (SRAM).

* * * * *